No. 617,137. Patented Jan. 3, 1899.
A. R. ANTHONY.
CONVEYER DRIVE CHAIN.
(Application filed Mar. 8, 1898.)
(No Model.) 2 Sheets—Sheet 1.
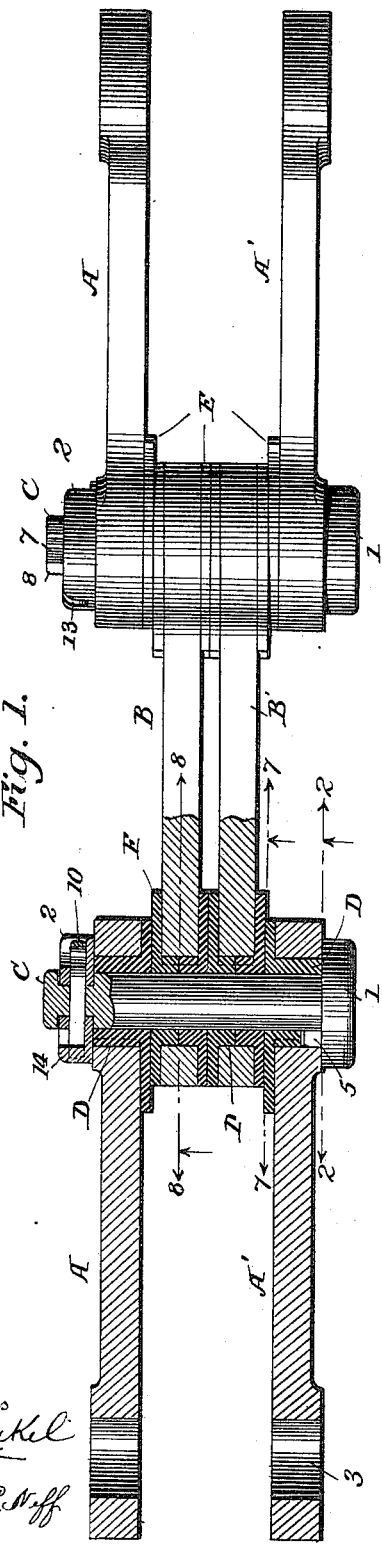
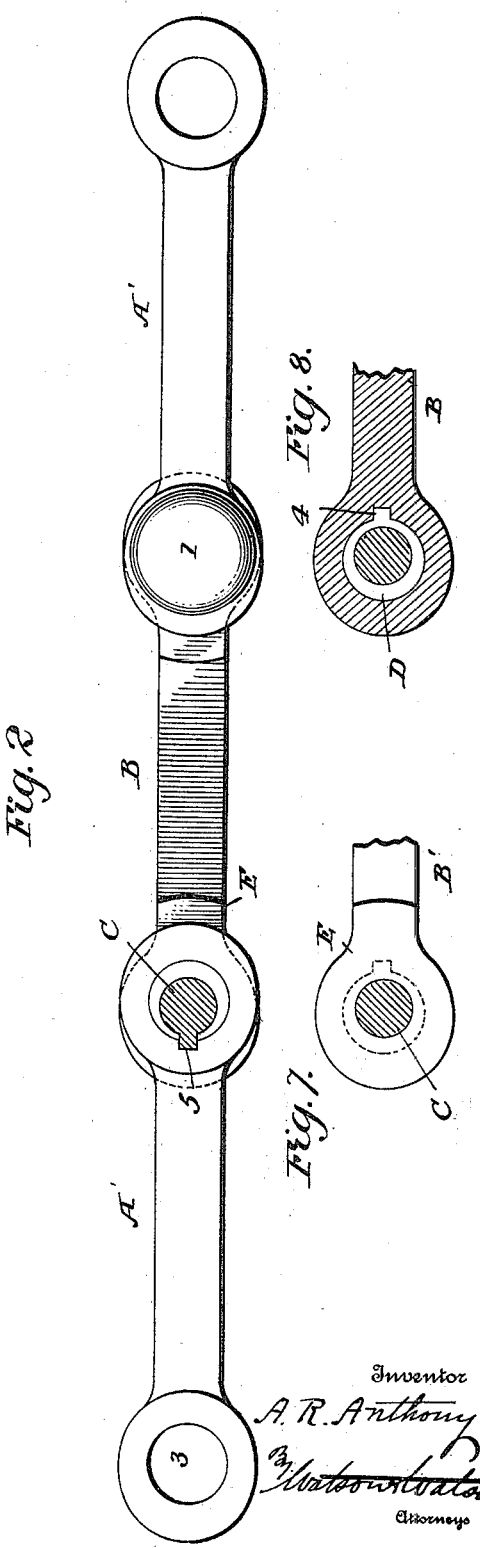
Inventor
A. R. Anthony No. 617,137. Patented Jan. 3, 1899.
A. R. ANTHONY.
CONVEYER DRIVE CHAIN.
(Application filed Mar. 8, 1898.)
(No Model.) 2 Sheets—Sheet 2.
Fig. 3.
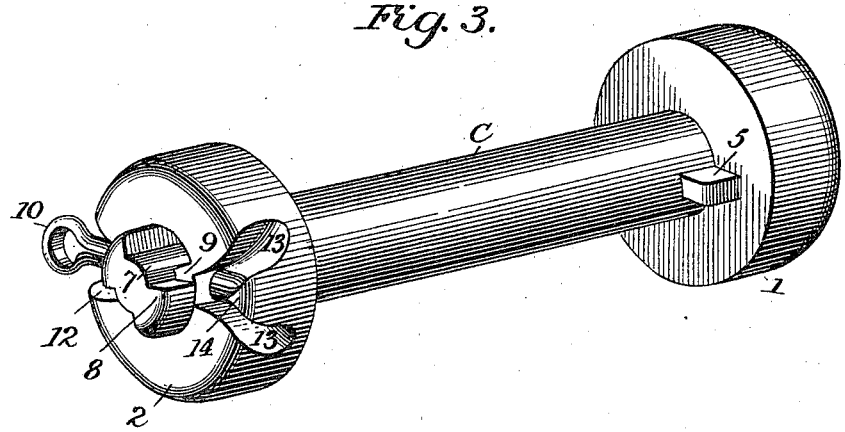
Fig. 9. Fig. 4. Fig. 10.
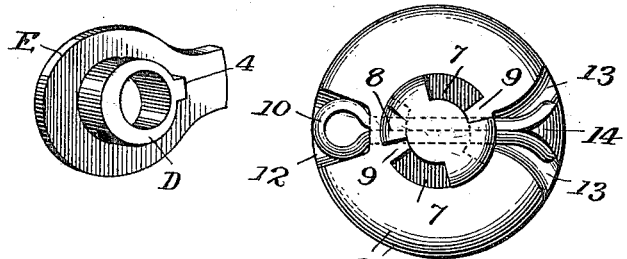 
Fig. 5. Fig. 6.
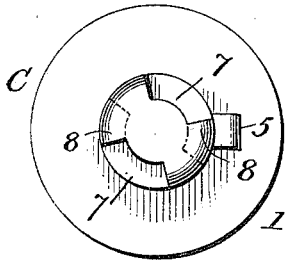 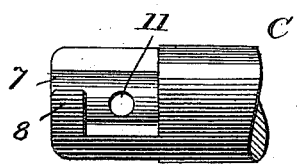
Witnesses
J. G. Hinkel
William E. Neff
Inventor
A. R. Anthony
Watson & Watson
Attorneys
THE NORRIS PETERS CO., PHOTO-LITHO., WASHINGTON, D. C.

UNITED STATES PATENT OFFICE.

ALFRED ROWAN ANTHONY, OF WILKES-BARRÉ, PENNSYLVANIA.

CONVEYER DRIVE-CHAIN.

SPECIFICATION forming part of Letters Patent No. 617,137, dated January 3, 1899.

Application filed March 8, 1898. Serial No. 673,105. (No model.)

*To all whom it may concern:*

Be it known that I, ALFRED ROWAN ANTHONY, a citizen of the United States, residing at Wilkes-Barré, in the county of Luzerne and State of Pennsylvania, have invented certain new and useful Improvements in Conveyer Drive-Chains, of which the following is a specification.

This invention relates to improvements in chains, and is particularly applicable to drive-chains and chains for various kinds of conveyers.

The invention consists particularly in improvements designed to increase the life of the chain and facilitate repairs.

In the accompanying drawings, Figure 1 is a plan view of a portion of the chain, parts being broken away to illustrate the interior construction. Fig. 2 is a side view of the same, partly in section, on the line 2 2, Fig. 1. Fig. 3 is a perspective view of a chain-pin, showing the cotter-pin partly inserted. Fig. 4 is an end view of the same, showing the cotter-pin inserted and locked. Fig. 5 is an end view of the pin with the head removed. Fig. 6 is a side view of one end of the pin. Figs. 7 and 8 are sections on the lines 7 7 and 8 8 of Fig. 1, respectively. Fig. 9 is a perspective view of one of the bushings, and Fig. 10 shows the two middle bushings formed integral.

Referring to the drawings, A A' indicate the outer links and B B' the inner links of a chain embodying my invention. The number of links in the chain and the particular purpose to which it may be applied are immaterial so far as my present invention is concerned. The invention is, however, particularly applicable to heavy drive-chains and conveyer-chains. The links are provided with removable wearing-plates and bushings which are designed to take all of the wear and which may be easily removed and replaced. The links proper are not subject to wear and will therefore last indefinitely.

As shown in the drawings, the links are connected by pins C, each pin having a permanent head 1 and a removable head 2. The eyes 3 of the links are of greater diameter than the pins C, and the links are provided with bushings having openings to receive the pins. As shown in Fig. 8, the bushings D are eccentric, being thicker on the side toward the end of the link, which side is most subject to strain and wear. On the opposite side is a feather 4, which fits a corresponding groove in the link to prevent the bushing from turning in the link. The links are also provided with facings or wearing-plates E to prevent the wear of the adjoining faces of the links upon each other. As shown, these plates are formed integral with the bushings, the bushings of each of the middle links B B' being formed in two parts, and each part having a facing or plate attached. The pins C are preferably prevented from turning in the outer links by suitable means. As shown, each pin is provided with a feather or projection 5, which engages a groove in the adjoining link A'. A single feather is sufficient, as the links A A' work in unison.

I prefer to use chain-pins of the construction shown in Figs. 3 to 6, inclusive, having removable heads. By making the head removable instead of attaching it by riveting I am enabled to harden the body of the pin, so that it will resist wear. Pins thus constructed will last for a long period without renewal. One end of the pin C is constructed to interlock with the removable head in some suitable manner, so that it cannot be pushed off by lateral pressure of the links. As shown, the end of the pin has two opposite recesses 7 7, the extent of each being about ninety degrees of the periphery at the end of the pin. These recesses are L-shaped, as shown clearly in Fig. 6, thus forming shoulders 8 on the end of the pin, which resist any lateral thrust on the head 2. The head 2 is circular in general outline and formed with a central opening similar in outline to the end of the pin, the said head having two inward projections 9, which slide in the recesses and can be arranged behind the shoulders 8 by slightly turning the head 2, as shown in Figs. 3 and 4.

To prevent the head 2 from turning, I provide a cotter-pin 10, which passes through the head and through an opening 11 in the pin. By a peculiar construction of the head 2 the cotter-pin is locked after it is inserted, and it is also protected, so that it is not liable to be injured or disturbed by objects with which the chain may come in contact. On one side of the head is a recess 12, which receives the end of the cotter-pin, and on the opposite side are a pair of divergent recesses 13, between which is a wedge-shaped partition 14, which separates the ends of the cotter-pin, bending them outward, and thus preventing the pin from accidentally falling out after it is once driven into place.

In Fig. 10 I have shown the inside bushings of the links B B' formed in one piece with a common flange E', which construction may be substituted, as these links move in unison.

The particular construction of removable pin-head described may also be used in connection with shafts and other articles which require removable heads, as well as with chain-pins.

The operation of my invention will be evident from an inspection of the drawings and the foregoing description. The parts are assembled by placing the bushings in the links, then passing the pin through, then placing the head 2 on the pin, turning it slightly to bring the holes for the cotter-pin in line, and finally forcing or driving the cotter-pin into position, as shown in Fig. 4. The pins are hardened, so that the wear is confined chiefly to the bushings and wearing-plates. When these are sufficiently worn to need attention, they can be replaced quickly by simply removing the heads 2 and taking the chain apart, all of the parts being detachable. After new bushings and wearing-plates are inserted the chain is reassembled, as above described. For conveyer purposes any suitable flights or buckets may be attached to the links of the chain.

It will be evident that various details may be changed without departing from the spirit of my invention.

Therefore, without limiting myself to the precise construction and arrangement of parts illustrated and described, I claim—

1. In a drive or conveyer chain, the combination with the links and pins of removable bushings in the eyes of the links and removable wearing-plates between the ends of the links, substantially as described.

2. In a drive or conveyer chain, the combination with the links and pins of removable bushings and wearing-plates for the links, said plates being integral with the bushings and arranged between the ends of the links, substantially as described.

3. In a drive or conveyer chain, the combination with detachable links and pins, of removable wearing-plates arranged in pairs between the inner and outer links respectively, whereby they receive the wear and protect the links, substantially as described.

4. A drive or conveyer chain having its inner links each provided with divided bushings and wearing-plates connected to said bushings, substantially as described.

5. A drive or conveyer chain having removable eccentric bushings inserted in the eyes of the links, and means for preventing said bushings from turning in the links, substantially as described.

6. In a chain the combination with the links, of a pin having a fixed head at one end and opposite L-shaped recesses at the opposite end, and a head having inward projections 9 adapted to interlock with said recesses, substantially as described.

7. In a chain the combination with a pin having a fixed head, of a detachable head and a split cotter-pin, said detachable head having a recess 12 to receive the head of the cotter-pin and a wedge-shaped projection 14 adapted to spread the split end of the cotter-pin, substantially as described.

8. A chain-pin having a fixed head at one end and L-shaped recesses 7 at the other end in combination with the removable head adapted to interlock with said recesses and the cotter-pin arranged to prevent said removable head from turning when it is interlocked with the pin, substantially as described.

9. The combination with a pin or shaft having opposite L-shaped recesses at its end, of a head having inward projections adapted to interlock with said recesses, a perforation through said head and shaft to receive a cotter-pin, and a wedge-shaped projection upon the head adapted to spread the split end of the cotter-pin, substantially as described.

In testimony whereof I affix my signature in presence of two witnesses.

ALFRED ROWAN ANTHONY.

Witnesses:
B. C. HAIGHT,
W. L. PARSONS.